US 009148486B2

(12) United States Patent
Wainner et al.

(10) Patent No.: US 9,148,486 B2
(45) Date of Patent: Sep. 29, 2015

(54) CONTENT DISTRIBUTION THROUGH BLIND-CACHE INSTANTIATION

(75) Inventors: Warren Scott Wainner, Sterling, VA (US); Mahesh Viveganandhan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 480 days.

(21) Appl. No.: 13/301,820

(22) Filed: Nov. 22, 2011

(65) Prior Publication Data

US 2013/0132498 A1 May 23, 2013

(51) Int. Cl.
*G06F 15/173* (2006.01)
*G06F 15/16* (2006.01)
*G06F 7/04* (2006.01)
*H04L 29/08* (2006.01)
*H04N 21/231* (2011.01)

(52) U.S. Cl.
CPC ........ *H04L 67/2847* (2013.01); *H04L 67/2885* (2013.01); *H04L 67/1021* (2013.01); *H04N 21/23106* (2013.01)

(58) Field of Classification Search
USPC ......................................... 709/208–211, 219
See application file for complete search history.

(56) References Cited

U.S. PATENT DOCUMENTS

| 5,924,116 | A  | * | 7/1999  | Aggarwal et al. ............. 711/122 |
|-----------|----|---|---------|--------------------------------------|
| 8,345,536 | B1 | * | 1/2013  | Rao et al. ....................... 370/216 |
| 2002/0026511 | A1 | * | 2/2002 | Garcia-Luna-Aceves et al. ............... 709/226 |
| 2002/0133570 | A1 | * | 9/2002 | Michel .......................... 709/219 |
| 2003/0079027 | A1 |   | 4/2003 | Slocombe et al. |
| 2003/0105865 | A1 | * | 6/2003 | McCanne et al. ............. 709/225 |
| 2005/0105475 | A1 | * | 5/2005 | Norrgard et al. ............... 370/254 |
| 2005/0135357 | A1 | * | 6/2005 | Riegel et al. ................... 370/389 |
| 2007/0280102 | A1 | * | 12/2007 | Vasseur et al. ................. 370/225 |
| 2009/0013083 | A9 | * | 1/2009 | Garcia-Luna-Aceves et al. .............................. 709/229 |
| 2009/0112915 | A1 | * | 4/2009 | Lele et al. ...................... 707/102 |
| 2009/0164661 | A1 |   | 6/2009 | Kim et al. |
| 2010/0074144 | A1 | * | 3/2010 | Yao et al. ....................... 370/254 |
| 2010/0318605 | A1 | * | 12/2010 | Weis .............................. 709/203 |
| 2011/0035497 | A1 | * | 2/2011 | Daly et al. ..................... 709/226 |
| 2012/0076048 | A1 | * | 3/2012 | Kanekar et al. ................ 370/254 |
| 2012/0221851 | A1 | * | 8/2012 | Ducharme et al. ............ 713/156 |

OTHER PUBLICATIONS

Swaminathan Sivasubramanian et al, "Glove CBC: Content Blid Result Caching for Dynamic Web applications", Technical Report IR-CS-022, Jun. 2006 pp. 1-19.*
Partial International Search Report dated Mar. 6, 2013 cited in Application No. PCT/US2012/066356, 5 pgs.
George Pallis et al., "A Latency-based Object Placement Approach in Content Distribution Networks," Proceedings of the Third Latin American Web Congress, Oct. 31, 2005, pp. 140-147.

* cited by examiner

*Primary Examiner* — Aftab N. Khan
(74) *Attorney, Agent, or Firm* — Marchant & Gould P.C.

(57) ABSTRACT

A slave resource router may receive a client request. The slave resource router may be the nearest representation of an Anycast IP address in a network to a client sending the client request in the network. The slave resource router may then determine that the slave resource router has been authorized to cache content for a delivery service corresponding to the client request. Next, the slave resource router may determine that content corresponding to the client request is cached locally in a blind cache. Then the slave resource router may provide the client with the content from the blind cache.

15 Claims, 5 Drawing Sheets

CONTENT DISTRIBUTION THROUGH BLIND-CACHE INSTANTIATION

BACKGROUND

Content delivery describes the delivery of media content such as audio, video, computer software, and video games over a delivery medium such as broadcasting or the Internet. Specialist networks, known as content delivery networks, distribute digital content on the Internet. Alternative technologies for content delivery include peer-to-peer file sharing technologies. Content can only be delivered if it exists. If it does not exist, several techniques and methods can be used for content creation or content regeneration. Alternatively, content delivery platforms create and syndicate content remotely, acting like hosted content management systems.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
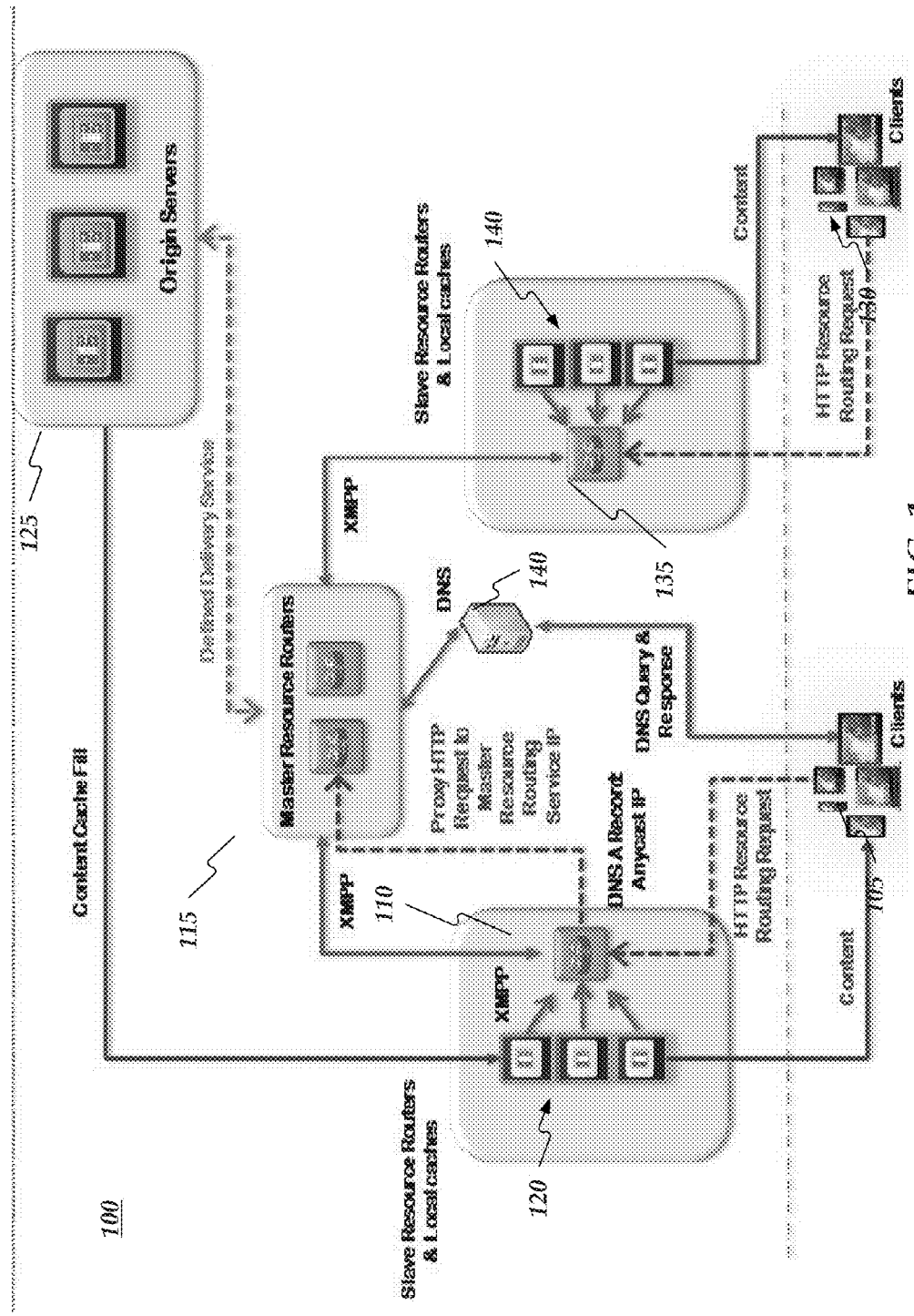
FIG. 1 shows an operating environment including a distributed request routing system.

A slave resource router may determine that the slave resource router has been authorized to cache content for a delivery service corresponding to the client request. A slave resource router may receive a client request. The slave resource router may be the nearest representation of a resource router in a network to a client sending the client request in the network. Next, the slave resource router may determine that content corresponding to the client request is cached locally in a blind cache (e.g. a cache unknown to the master resource router). Then the slave resource router may provide the client with the content from the blind cache.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Content distribution through blind-cache instantiation may be provided. Consistent with embodiments of the disclosure, a client may request a piece of content from a content source. The client may resolve a domain name service (DNS) address to an internet protocol (IP) address. Consistent with embodiments of the disclosure, the IP address that the client resolved routes the client to a nearest slave resource router for the piece of content. The nearest slave resource router may look in its local cache and determine that it has a copy of the piece of content so that the nearest slave resource router can locally service the request. Consistent with embodiments of the disclosure, while a master resource router may know the nearest slave resource router exists, the master resource router may have no awareness of the nearest slave resource router locally servicing the request. Thus load on the master resource router may be relived.

FIG. 1 shows an operating environment including a distributed request routing system 100. As shown in FIG. 1, distributed request routing system 100 may comprise a plurality of clients comprising a client 105, a slave resource router 110 (e.g. nearest proxy resource router), a master resource router 115, and origin servers 125 that may store original content. Slave resource router 110 may include a blind cache 120 that may be used to locally store content from origin servers 125. Distributed request routing system 100 may also comprise other clients 130, other slave resource router 135, other blind cache 140, and a domain name server (DNS) 140. DNS 140 may be used by client 105 to resolve a DNS address to an internet protocol (IP) address.

Consistent with embodiments of the disclosure, client 105 does not need to know that slave resource router 110 exists. Only master resource router 115 may know that slave resource router 110 exists. A catalog used by client 105 may only need one fully qualified domain name (FQDN) assigned to a delivery service (e.g. for master resource router 115.) Moreover, master resource router 115 may not know about blind cache 120 associated with slave resource router 110. In other words, blind cache 120 may be hidden from master resource router 115. This may help cut down on the number of assets that master resource router 115 may need to track, for example, on a global basis.

Slave resource router 110 may manage the local availability of content on blind cache 120 in accordance with a policy defined in master resource router 115. The policy may be determined, for example, at a time of registration between slave resource router 110 and master resource router 115. For example, the policy may indicate that slave resource router 110 may only service standard definition television (SDTV) assets, but not high definition television (HDTV) assets, or that slave resource router 110 may only distribute PlayReady encrypted assets.

Furthermore slave resource router 110 may register with multiple master resource routers (e.g. in addition to master resource router 115.) This may allow a delegate CDN hosting slave resource router 110 to serve more than one upstream CDN. For example, Company A might be a delegate for Company B and Company C video content service. If Company A's slave resource router registers with both Company B's and Company C's master resource router, Company A may now be able to serve client requests with locally cached content. Neither Company B nor Company C need to be aware of the content served. Moreover, either could put restrictions on what can be locally cached. For example, Company B/Company C might not allow caching of the ads and ad-links while the video clips are cached. This may optimize delivery service while facilitating transparent services.

Consistent with embodiments of the disclosure, master resource router 115 may be configured with delivery services and associated Anycast resource routing IP/FQDN. Master resource router 115 delivery service may be associated with content and/or content origins and may be configured with eligible slave resource router 110 devices for each delivery service. In addition, master resource router 115 may be configured with service addresses to which slave resource router 110 may register and may be configured with credentials for slave resource router 110 registration.

In addition, slave resource router 110 may be configured with master resource router 115's service address, may be configured with credentials for registration to master resource router 115, and may be configured with local cache resources. Slave resource router 110 may register with master resource router 115 and receive permission to service requests for a given delivery service. Slave resource router 110 may instantiate an Anycast address (e.g. a topologically nearest node address) for a given delivery service and advertise this to a network (e.g. the Internet.) Slave resource router 110 may then await client 105's requests for resource routing.

Consistent with embodiments of the disclosure, a topologically nearest node address may be used. One such topologically nearest node address protocol may comprise, but is not limited to, Anycast. Anycast may comprise a network addressing and routing methodology in which datagrams from a single sender may be routed to the topologically nearest node in a group of potential receivers all identified by the same destination address. Anycasting is designed to let one host initiate the efficient updating of router tables for a group of hosts. IPv6, for example, can determine which gateway host is closest and send the packets to that host as though it were a unicast communication. In turn, that host can Anycast to another host in the group until all routing tables are updated.

Figure 2A:
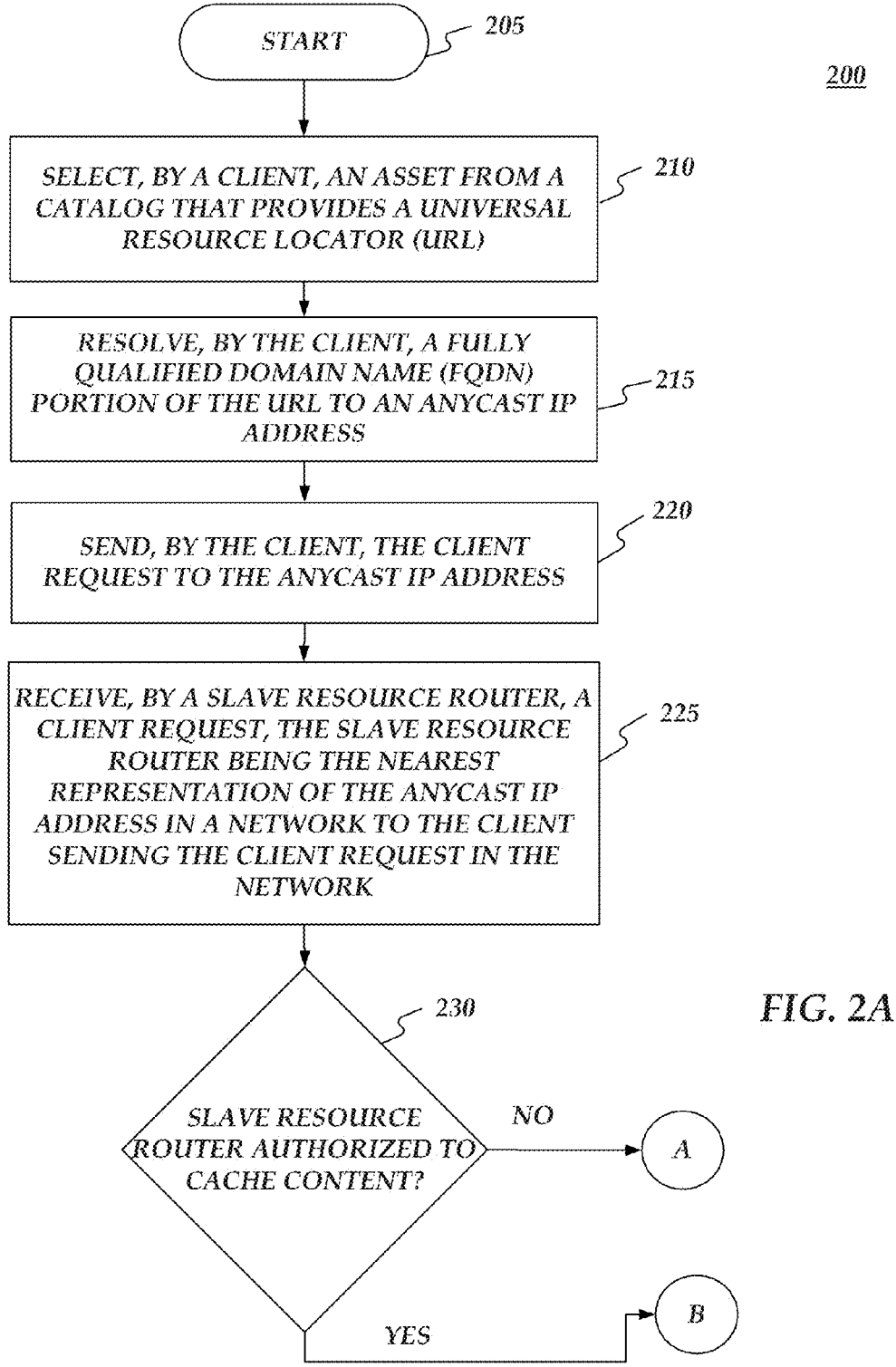
FIGS. 2A, 2B, and 2C are a flow chart of a method for providing distributed request routing.
Figure 2B:
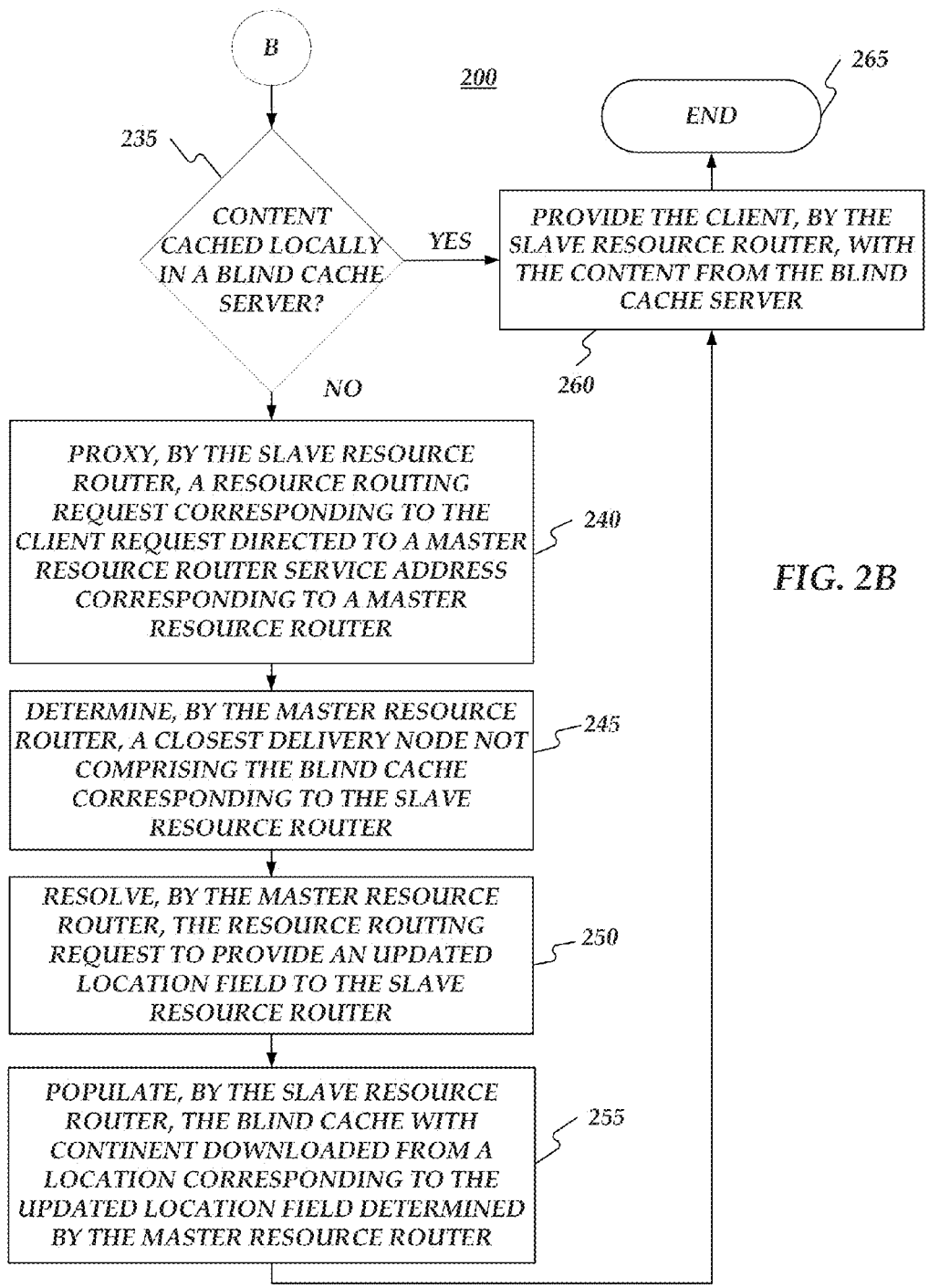
Figure 2C:
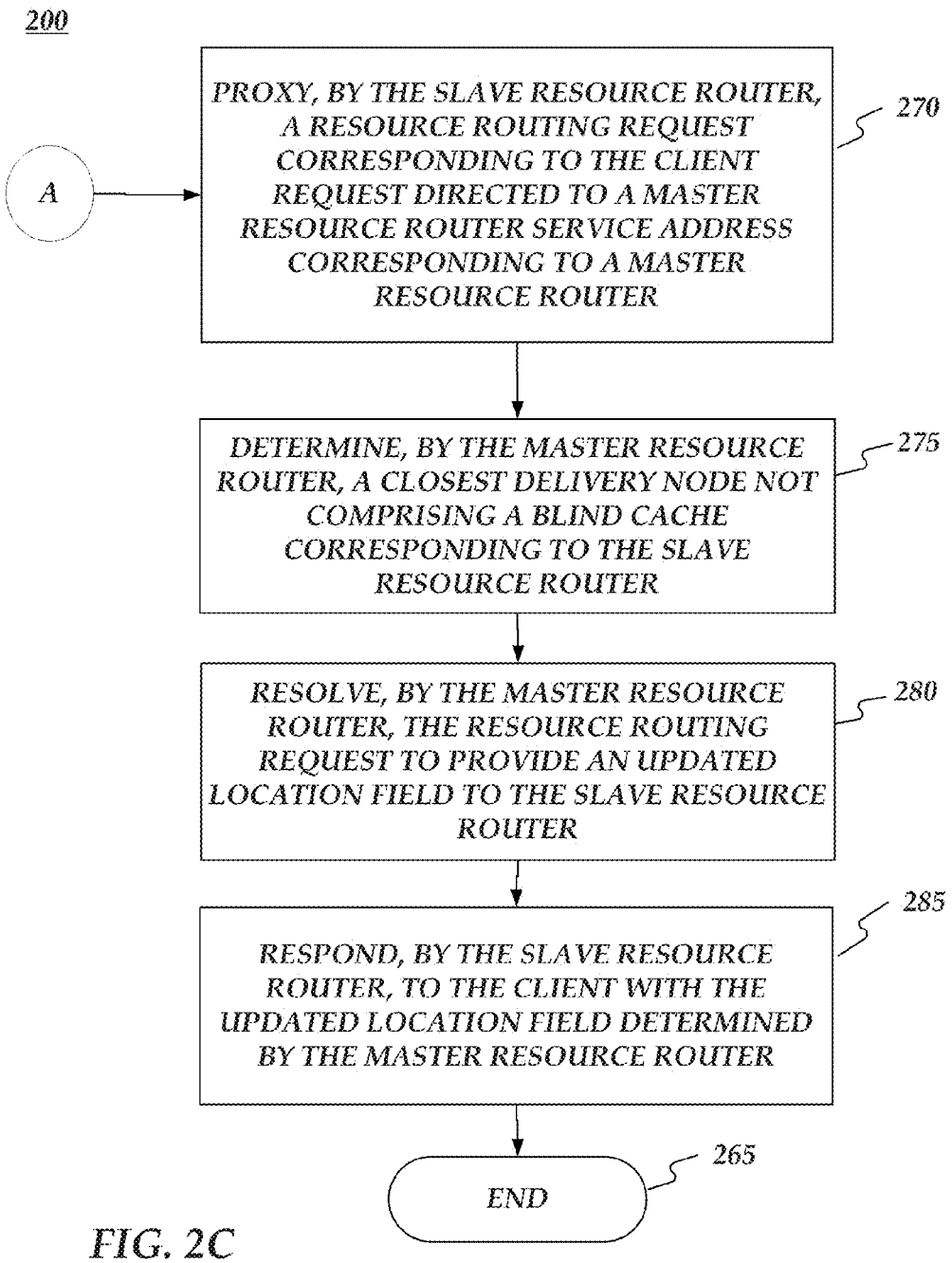

FIGS. 2A, 2B, and 2C are a flow chart setting forth the general stages involved in a method 200 consistent with embodiments of the disclosure for providing content distribution through blind-cache instantiation. Method 200 may be implemented using any one or more of client 105, slave resource router 110, and master resource router 115 where any of the aforementioned may be implemented, for example, by a computing device 300 as described in more detail below with respect to FIG. 3. Ways to implement the stages of method 200 will be described in greater detail below.

As shown in FIG. 2A, method 200 may begin at starting block 205 and proceed to stage 210 where client 105 may select an asset from a catalog that provides a universal resource locator (URL). For example, client 105 may request a piece of content from a content source. In doing so, client 105 may obtain the URL corresponding to the piece of content from the catalog.

From stage 210, where client 105 selects the asset from the catalog, method 200 may advance to stage 215 where client 105 may resolve a fully qualified domain name (FQDN) portion of the URL to the Anycast IP address. For example, client 105 may send DNS 140 the FQDN of the URL. In response, DNS 140 may resolve the FQDN of the URL to an internet protocol (IP) address comprising the Anycast IP address and return the Anycast IP address to client 105.

Once client 105 resolves the fully qualified domain name (FQDN) portion in stage 215, method 200 may continue to stage 220 where client 105 may send the client request to the Anycast IP address. For example, client 105 may send the client request to a network comprising the Internet directed to the Anycast IP address received from DNS 140.

After client 105 sends the client request in stage 220, method 200 may proceed to stage 225 where slave resource router 110 may receive the client request. Slave resource router 110 may be the nearest representation of the Anycast IP address in the network (e.g. the Internet) to client 105 sending the client request in the network. For example, other slave resource router 135 may have the same IP address as slave resource router 110. However, because slave resource router 110 instantiated an Anycast address for the given delivery service corresponding to the client request and advertised this instantiated Anycast address to the network, the client request is serviced by slave resource router 110 because it is the nearest representation of the Anycast IP address in the network.

From stage 225, where slave resource router 110 receives the client request, method 200 may advance to decision block 230 where it may be determined by slave resource router 110 that slave resource router 110 has been authorized to cache content for a delivery service corresponding to the client request. For example, slave resource router 110 may have registered with master resource router 115 and received permission (e.g. authorization) to cache content for the delivery service corresponding to the client request.

Turning to FIG. 2B, if it was determined at decision block 230 that slave resource router has been authorized to cache the content, method 200 may advance to decision block 235 where slave resource router 110 may determine that the content corresponding to the client request is cached locally in blind cache 120. If it was determined that content corresponding to the client request is not cached locally in blind cache 120 at decision block 235, method 200 may advance to stage 240 where slave resource router 110 may proxy a resource routing request corresponding to the client request directed to a master resource router service address corresponding to master resource router 115. For example, if slave resource router 110 checks blind cache and discovers that the content is not cached locally in blind cache 120, slave resource router 110 may proxy the client request on up to master resource router 115. This proxy stage may not be noticed by client 105.

From stage 240, where slave resource router 110 proxies the resource routing request, method 200 may advance to stage 245 where master resource router 115 may determine a closest delivery node not comprising blind cache 120 corresponding to slave resource router 110. For example, master resource router 115 may determine that content needed to service the client request is located, for example, on origin servers 125 since master resource router 115 may track content location on a global basis.

Once master resource router 115 determines the closest delivery node in stage 245, method 200 may continue to stage 250 where master resource router 115 may resolve the resource routing request to provide an updated location field to slave resource router 110. For example, once master resource router 115 determines that the content needed to service the client request is located on origin servers 125, master resource router 115 may pass this information (e.g. the location field) on to slave resource router 110.

After master resource router 115 resolves the resource routing request in stage 250, method 200 may proceed to stage 255 where slave resource router 110 may populate blind cache 120 with continent downloaded from a location corresponding to the updated location field determined by master resource router 115. For example, now that slave resource router 110 knows that the desired content is on origin servers 125, slave resource router 110 may get the content from origin servers 125 and save it to blind cache 120 since master resource router 115 has authorized slave resource router 110 to do so.

From stage 255, where slave resource router 110 populates blind cache 120, or from decision block 235 where it was determined that content corresponding to the client request is cached locally, method 200 may advance to stage 260 where slave resource router 110 may provide client 105 with the content from blind cache 120. For example, because slave resource router 110 may have the desired content (either because it went and obtained it or because it already had it) slave resource router 110 may service the client request with the content from blind cache 120. Slave resource router 110 does not need to provide the content although it can. It may provide the IP address or FQDN of blind cache 120 to which the client may request the content. Slave resource router 110 may direct the client request to the most appropriate content delivery server in the CDN.

Turning now to FIG. 2C, if it was determined that slave resource router 110 has not been authorized to cache content at decision block 230, method 200 may advance to stage 270 where slave resource router 110 may proxy a resource routing request corresponding to the client request directed to a master resource router service address corresponding to master resource router 115. For example, slave resource router 110 may have registered with master resource router 115, but was not given permission (e.g. not authorized) to cache content for the delivery service corresponding to the client request. In this case, slave resource router 110 may proxy the client request on up to master resource router 115. This proxy stage may not be noticed by client 105.

Once slave resource router 110 proxies the resource routing request in stage 270, method 200 may continue to stage 275 where master resource router 115 may determine a closest delivery node not comprising blind cache 120 corresponding to slave resource router 110. For example, master resource router 115 may determine that content needed to service the client request is located, for example, on origin servers 125 since master resource router 115 may track content location on a global basis.

After master resource router 115 determines the closest delivery node in stage 275, method 200 may proceed to stage 280 where master resource router 115 may resolve the resource routing request to provide an updated location field to slave resource router 110. For example, once master resource router 115 determines that the content needed to service the client request is located on origin servers 125, master resource router 115 may pass this information (e.g. the location field) on to slave resource router 110.

From stage 280, where master resource router 115 resolves the resource routing request, method 200 may advance to stage 285 where slave resource router 110 may respond to client 105 with the updated location field determined by master resource router 115. For example, since master resource router 115 has not authorized slave resource router 110 to save the content to blind cache 120, slave resource router 110 may provide client 105 with information where client 105 can get the content. In other words, the client request may be serviced from origin servers 125 rather than blind cache 120 when master resource router 115 has not authorized slave resource router 110 to save the content to blind cache 120. Once slave resource router 110 responds to client 105 in stage 285 or once slave resource router 110 provides client 105 with the content in stage 260, method 200 may then end at stage 265.

Figure 3:
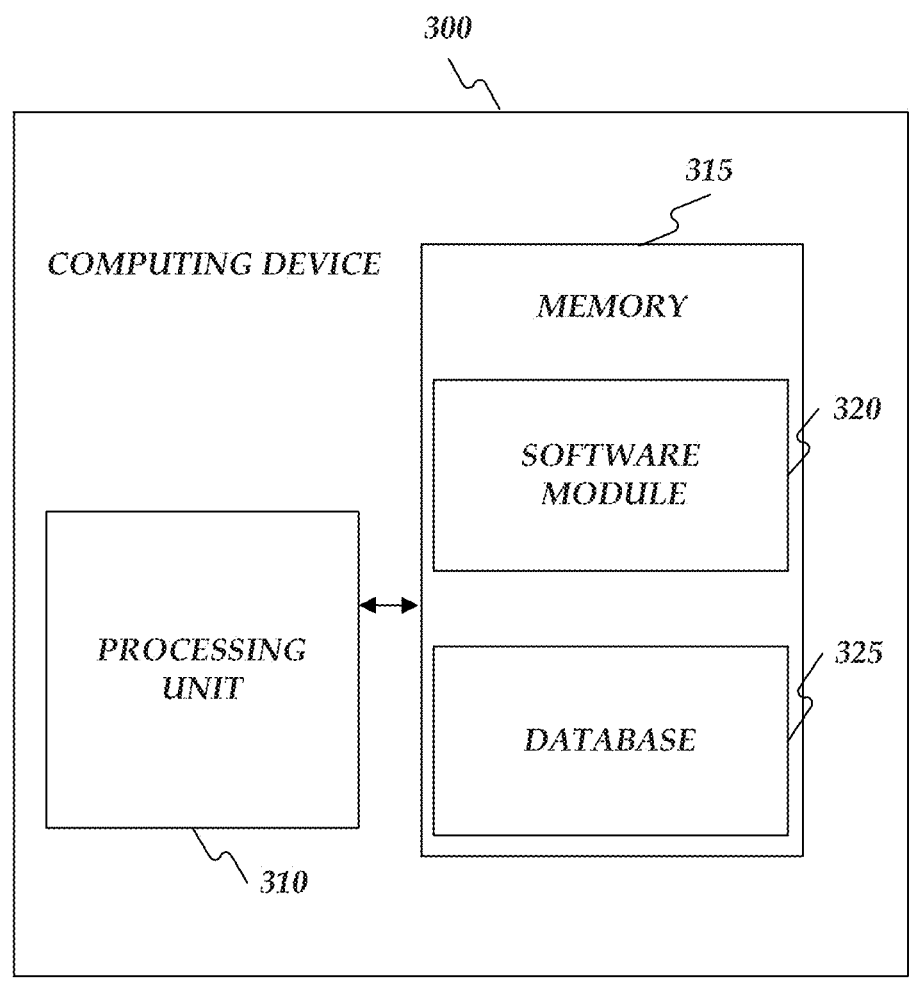
FIG. 3 shows a computing device.

FIG. 3 shows computing device 300 in more detail. As shown in FIG. 3, computing device 300 may include a processing unit 310 and a memory unit 315. Memory unit 315 may include a software module 320 and a database 325. While executing on processing unit 310, software module 320 may perform processes for providing content distribution through blind-cache instantiation, including for example, any one or more of the stages from method 200 described above with respect to FIGS. 2A, 2B, and 2C. Computing device 300, for example, may provide an operating environment for client 105, slave resource router 110, or master resource router 115. Client 105, slave resource router 110, or master resource router 115 may operate in other environments and are not limited to computing device 300.

Computing device 300 ("the processor") may be implemented using a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

An embodiment consistent with the disclosure may comprise a system for providing content distribution through blind-cache instantiation. The system may comprise a memory storage and a processing unit coupled to the memory storage. The processing unit may be operative to register with a master resource router and to receive permission to service requests for at least one delivery service. In addition, the processing unit may be operative to instantiate an Anycast address for the at least one delivery service and to advertise the instantiated Anycast address for the at least one delivery service to a network.

Another embodiment consistent with the disclosure may comprise a system for providing content distribution through blind-cache instantiation. The system may comprise a memory storage and a processing unit coupled to the memory storage. The processing unit may be operative to receive a client request. The processing unit may be the nearest representation of an Anycast IP address in a network to a client sending the client request in the network. In addition, the processing unit may be operative to determine that it has not been authorized to cache content for a delivery service corresponding to the client request and to proxy a resource routing request corresponding to the client request directed to a master resource router service address corresponding to a master resource router. Moreover, the processing unit may be operative to respond to the client with an updated location field determined by a master resource router. The master resource router may determine a closest delivery node not comprising a blind cache corresponding to the processing unit and may resolve the resource routing request to provide the updated location field to the processing unit.

Yet another embodiment consistent with the disclosure may comprise a system for providing content distribution through blind-cache instantiation. The system may comprise a memory storage and a processing unit coupled to the memory storage. The processing unit may be operative to receive a client request. The processing unit may be the nearest representation of an Anycast IP address in a network to a client sending the client request in the network. In addition, the processing unit may be operative to determine that the slave resource router has been authorized to cache content for a delivery service corresponding to the client request. Moreover, the processing unit may be operative to determine that content corresponding to the client request is cached locally in a blind cache and to provide the client with the content from the blind cache.

In yet another embodiment consistent with the disclosure may comprise a system for providing content distribution through blind-cache instantiation. The system may comprise a memory storage and a processing unit coupled to the memory storage. The processing unit may be operative to receive a client request. The processing unit may be the nearest representation of an Anycast IP address in a network to a client sending the client request in the network. Moreover, the processing unit may determine that the slave resource router has been authorized to cache content for a delivery service corresponding to the client request and to determine that content corresponding to the client request is not cached locally in a blind cache corresponding to the procession unit. In addition, the processing unit may be operative to proxy a resource routing request corresponding to the client request directed to a master resource router service address corresponding to a master resource router. The master resource router may determine a closest delivery node not comprising the blind cache corresponding to the processing unit and resolve the resource routing request to provide an updated location field to the procession unit. Furthermore, the processing unit may be operative to populate the blind cache with continent downloaded from a location corresponding to the updated location field determined by the master resource router and to provide the client with the content from the blind cache.

Consistent with embodiments of the disclosure, the Anycast IP address may be one form of representation of the slave resource router 110 in the network. Slave resource router 110 may have a unique IP address that DNS 140 may refer to based on, for example, geo-location. Slave resource router 110 may have to update its presence to DNS 140 based, for example, on successful registration with the master resource router 115. Alternatively, the slave resource router 110 may assume the IP identity of master resource router 115 using the IP Anycast model where DNS 140 may provide the same IP address. In this case, slave resource router 110 may advertise the IP Anycast address into the network after successful registration with master resource router 115.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   registering, by a slave resource router, with a master resource router;
   receiving, by the slave resource router, permission to service requests for at least one delivery service;
   instantiating, by the slave resource router, a topologically nearest node address for the at least one delivery service;
   advertising, by the slave resource router, the instantiated topologically nearest node address for the at least one delivery service to a network;
   receiving, by the slave resource router, a request for the at least one delivery service for a content from a client device;
   determining whether the slave resource router has the content stored in a local cache;
   determining, in response to the determination that the content is not stored in the local cache, whether the slave resource router is authorized to store the content in the local cache; and caching, in response to the determination that the slave resource router is authorized to store the content on the local cache, the content in the local cache from an origin server.

2. The method of claim 1, further comprising configuring the slave resource router with the master resource router's service address.

3. The method of claim 1, further comprising configuring the slave resource router with credentials for registration with the master resource router.

4. The method of claim 1, further comprising configuring the master resource router with the at least one delivery service and associated topologically nearest node Resource Routing IP/FQDN.

5. The method of claim 1, further comprising configuring the master resource router with the at least one delivery service associated with at least one of content and content origins.

6. The method of claim 1, further comprising configuring the master resource router with eligible slave resource router devices for the at least one delivery service.

7. The method of claim 1, further comprising configuring the master resource router with service addresses to which the slave resource router will register.

8. The method of claim 1, further comprising configuring the master resource router with credentials for the slave resource router registration.

9. The method of claim 1, further comprising:
providing the content to the client device by the slave resource router from the local cache.

10. The method of claim 1, further comprising:
forwarding, in response to the determination that the slave resource router does not have permission to store the content on the local cache, the request to the master resource router.

11. The method of claim 10, further comprising:
receiving from the master resource center an address for an alternate slave resource router; and
forwarding the request to the alternate slave resource router.

12. An apparatus comprising:
a slave resource router configured to:
register with a master resource router;
receive permission, from the master resource router, to service requests for at least one delivery service;
instantiate a topologically nearest node address for the at least one delivery service;
advertise the instantiated topologically nearest node address for the at least one delivery service to a network;
receive a request for the at least one delivery service for a content from a client device;
determine whether the slave resource router has the content stored in a local cache;
determine, in response to the determination that the content is not stored in the local cache, whether the slave resource router is authorized to store the content in the local cache; and
cache, in response to the determination that the slave resource router is authorized to store the content on the local cache, the content in the local cache from an origin server.

13. The apparatus of claim 12, wherein the slave resource router is further configured to forward, in response to the determination that the slave resource router does not have permission to store the content on the local cache, the request to the master resource router.

14. The apparatus of claim 13, wherein the slave resource router is further configured to:
receive from the master resource center an address for an alternate slave resource router; and
forward the request to the alternate slave resource router.

15. An apparatus comprising:
a processor, and
a memory having instructions which when executed by the processor may configure a slave resource router to:
register with a master resource router;
receiving permission, from the master resource router, to service requests for at least one delivery service;
instantiate a topologically nearest node address for the at least one delivery service;
advertise the instantiated topologically nearest node address for the at least one delivery service to a network,
receive, by the slave resource router, a request for the at least one delivery service for a content from a client device;
determine whether the slave resource router has the content stored in a local cache;
determine, by the slave router, in response to the determination that the content is not stored in the local cache, whether the slave resource router is authorized to store the content in the local cache; and
cache, in response to the determination that the slave resource router is authorized to store the content on the local cache, the content in the local cache from an origin server.

* * * * *